United States Patent
Waters (10) Patent No.: US 6,659,618 B2
(45) Date of Patent: Dec. 9, 2003

(54) HEADWEAR HAVING A BRIM WITH ILLUMINATION DEVICE

(76) Inventor: Michael Waters, 372 Bateman Cir. North, Barrington Hills, IL (US) 60010

(*) Notice: Subject to any disclaimer, the term of this patent is extended or adjusted under 35 U.S.C. 154(b) by 0 days.

(21) Appl. No.: 10/287,460

(22) Filed: Nov. 4, 2002

(65) Prior Publication Data

US 2003/0117575 A1 Jun. 26, 2003

Related U.S. Application Data

(63) Continuation-in-part of application No. 10/006,919, filed on Nov. 7, 2001.

(51) Int. Cl.[7] ............................................. F21L 15/14
(52) U.S. Cl. ..................................... 362/106; 362/105
(58) Field of Search ............................... 362/106, 105, 362/103, 107

(56) References Cited

U.S. PATENT DOCUMENTS

| | | |
|---|---|---|
| 1,255,265 A | 2/1918 | Zachara |
| 2,638,532 A | 5/1953 | Brady |
| 2,904,670 A | 9/1959 | Calmes |
| 3,032,647 A | 5/1962 | Wansky et al. |
| 3,040,881 A | 6/1962 | McNeil |
| 3,060,308 A | 10/1962 | Fortuna |
| 3,123,208 A | 3/1964 | Barnum et al. |
| 3,184,058 A | 5/1965 | Crowther |
| 3,350,552 A | 10/1967 | Lawrence |
| 4,005,776 A | 2/1977 | Seeley |
| 4,283,127 A | 8/1981 | Rosenwinkel et al. |
| 4,669,610 A | 6/1987 | Lindsey et al. |
| 4,959,760 A | 9/1990 | Wu |
| D316,932 S | 5/1991 | Escher, Jr. |
| 5,060,814 A | 10/1991 | Oglesbee |
| 5,218,385 A | 6/1993 | Lii |
| 5,230,558 A | 7/1993 | Jong |
| 5,249,675 A | 10/1993 | Strauss et al. |
| D349,123 S | 7/1994 | Cooley et al. |
| 5,331,357 A | 7/1994 | Cooley et al. |
| 5,404,593 A | 4/1995 | Kronenberger |
| 5,423,419 A | 6/1995 | Wentz et al. |
| 5,485,358 A * | 1/1996 | Chien .......................... 362/106 |
| 5,510,961 A | 4/1996 | Peng |
| 5,541,767 A | 7/1996 | Murphy et al. |
| 5,667,292 A | 9/1997 | Sabalvaro, Jr. |
| 5,722,762 A | 3/1998 | Soll |
| 5,730,290 A | 3/1998 | Futo |
| 5,741,060 A | 4/1998 | Johnson |
| 5,836,673 A | 11/1998 | Lo |
| D407,187 S | 3/1999 | Makki |
| 5,946,071 A | 8/1999 | Feldman |
| 5,997,165 A | 12/1999 | Lehrer |
| 6,012,827 A | 1/2000 | Caplan et al. |
| 6,032,293 A | 3/2000 | Makki |
| D428,431 S | 7/2000 | Jordan |
| 6,168,286 B1 | 1/2001 | Duffy |
| 6,206,543 B1 * | 3/2001 | Henry .......................... 362/191 |
| 6,345,716 B1 | 2/2002 | Chapman |
| 6,382,407 B1 | 5/2002 | Chao |

* cited by examiner

Primary Examiner—Hung Xuan Dang
(74) Attorney, Agent, or Firm—Fitch, Even, Tabin & Flannery (57) ABSTRACT

Lighted headgear is provided to enable clear vision in poorly lit locations. The lighted headgear has lights, such as LEDs that generate narrow light beam cones. The headgear is preferably a baseball-type hat with the LEDs secured in small notches in the forward edge of the brim, or in light modules attached toward the brim forward edge. The lights can be similarly provided with a variety of other headgear types including rigid safety hats and rigid fire fighters helmets to name a few. In one form, the lights are positioned so that their respective light beam cones overlap to provide high brightness light in a conical overlap area that can be in the range of normal reading distances or at other distances depending on the intended use of the hat.

32 Claims, 9 Drawing Sheets

HEADWEAR HAVING A BRIM WITH ILLUMINATION DEVICE

CROSS REFERENCE TO RELATED APPLICATIONS

This is a continuation-in-part, of prior application Ser. No. 10/006,919, filed Nov. 7, 2001, which is hereby incorporated herein by reference in its entirety.

FIELD OF THE INVENTION

This invention relates to headwear with a forwardly extending brim, bill or visor such as caps, hats and helmets.

BACKGROUND

The use of lights and other illuminating devices with headgear is known. However, prior illuminated headgear particularly of the soft baseball cap variety, have not been particularly well designed in terms of substantially maintaining the original cap configuration without intrusive alterations and/or additions for the lights, while at the same time being able to provide optimized illumination in the field of view of the wearer without changing the comfort and fit of the hat on the wearers head.

Incandescent light bulbs commonly have been proposed for use with lighted headgear. Unfortunately, such lighting devices generate a significant amount of heat, and are relatively heavy. Smaller, less powerful incandescent lights still may make the wearer feel quite uncomfortable after even a short while due to the proximity of the light source and the wearer's face. Further decreasing the size of the incandescent lights, to the point where the wearer is comfortable, may cause light output to be very dim and therefore unusable for illuminating areas forwardly of the wearer. In one aspect of the present invention, this area can be at distances that reading material is commonly held forward from a reader's eyes, e.g. on the order of ten to eighteen inches from the eyes. A light that is capable of brightly illuminating the filed of view within that range of distances is necessary for ensuring comfort in reading in dimly lighted areas. However, a lower intensity light bulb or lamp, which may be preferable to reduce heat or increase battery life, may result in less than optimal lighting causing eyestrain and discomfort. Alternatively, where illumination is desired at further distances forwardly from the hat wearer, such as when the hat is being worn during sport's activities undertaken in dim light conditions, e.g. jogging at night, incandescent bulbs, particularly those of the size and weight suitable for use with hats, cannot provide the desired illumination far enough forwardly from the hat wearer.

The use of fiber optic lighting devices instead of incandescent light bulbs is known. In such devices, optical fibers are bundled together to create a light producing device. The nature of fiber optics is such that there is no heat generated at the point where the light is typically transmitted. Unfortunately, such devices suffer from a rather major limitation. Namely, a very intense and powerful light source must be available to provide light to the optical fibers. For example, headgear such as worn by surgeons having a fiber optic lighting devices must at all times stay tethered to a fiber optic light source, which severely restricts the mobility of the user and thus the ease of use of the headgear. A portable light source that stays connected to the fiber optic light head via fiber optic cables extending away from the wearer is not desirable because of the inconveniences of having to carry the light source as well as having to deal with the dangling connecting lines of the fiber optic devices.

An additional problem that exists with fiber optic devices, as well as incandescent lighting devices, is rapid battery consumption. Incandescent light bulbs are known to consume large amounts of power. Similarly, a fiber optic device, since it requires a strong lighting source, also requires a large amount of power. As a result, the user is forced to change batteries often or stay tethered to a constant power source or light source.

Another disadvantage in prior art lighting devices is the manner in which surfaces are illuminated. Lighting devices used in the medical field generally produce a single fixed narrow beam of light to brightly illuminate the particular stationary body area on which the doctor may be operating. However, such a single narrow beam would not be particularly helpful for the broader or wider lighted field of view needed by runners, for example.

Accordingly, there is a need for lighted headgear that is optimized in terms of its fit and wearability, and its ability to project light for use in poorly lit or dim areas. More particularly, a hat having lights that are arranged to direct an optimum amount of light without inconvenience to the hat wearer is needed. Further, lights that are very compact and lightweight, while still providing the necessary lighting strength and having a sufficiently long life for the power sources that power these lights would be desirable.

SUMMARY OF THE INVENTION

In accordance with the present invention, illuminated headwear with one or more illumination devices are provided to illuminate the area forwardly of the person wearing the hat. The preferred headwear is a soft sports hat or cap having a forwardly extending, more rigid brim such as commonly worn by baseball players. In this form, the lighted hat substantially retains its original unlighted configuration from the perspective of the wearer both in terms of its appearance and comfort when worn. As such hats are worn fairly commonly whether or not the wearer is engaged in a sporting activity, keeping the hat's appearance substantially similar to that when in its unlighted configuration is fairly important. Manifestly, since such hats are worn fairly frequently and over long stretches of time, they also need to be fairly comfortable.

Accordingly, the preferred hat employs a pair of small, light emitting diodes (LEDs) and in particular the lens portions thereof, e.g. less than approximately 0.375 inch in length and approximately 0.1875 inch in diameter, that are secured to the brim portion of the hat at or adjacent to the front of the outer edge thereof in a non-obtrusive manner. The LEDs are of a solid-state material so that they generate high intensity beams of light projecting forwardly form the front edge of the brim and do not require a large size thereof and large power source therefor. The high intensity LEDs can be efficiently arranged so that a minimum number of lights are employed on the hat while still achieving a well-lit area projecting far forwardly from the hat wearer. In particular, only a pair of small LEDs spaced laterally on either side of the hats fore and aft extending centerline need be employed to achieve high powered lighting with the hat herein. Since the LEDs project comes of light forwardly therefrom, there will only be a relatively small unlit area immediately forwardly of the brim front edge that extends in an uninterrupted manner between these two cones of light. This unlit area is of little consequence as it is generally above the wearer's field of view, and thus saves the need for providing a light on the hat centerline to light up this area.

Thus, the present hat includes an efficient positioning of the high intensity lights thereon so that they are not obtrusive both in terms of the hat's appearance, and do not require significant space in and on the hat for associated electrical circuitry, as will be described hereinafter.

In the preferred forms, the laterally spaced LEDs can be either secured in cut-out notches formed in the front edge of the brim portion or housed in compact, self-contained light modules so that they are generally adjacent the outer edge of the hat brim portion. In either case, the brim portion need not have its thickness significantly increased over its normal thickness, and thus it still retains it original form. The light modules are substantially the same as described in applicants' '919 patent application, and thus provide high intensity light for the hat emanating from very compact housings of the modules. However, because the compact light modules are secured onto the brim portion and thus project therefrom, they are less desired from an aesthetic standpoint. By contrast, the notches in the brim are preferably sized so that approximately half or more of the size or length of the LEDs fits therein so that only a relatively smaller portion of the LED dome lens projects therefrom. In this manner, when the lights are off, the LEDs will not be particularly noticeable so that the hat can be worn in a normal manner from an aesthetic standpoint.

In the most preferred form of the hat with the LEDs secured in the brim notches as described above, the power circuitry for the LEDs is arranged and configured to maintain the hat configuration substantially unaltered from its normal configuration without lights. As is known, baseball caps typically are of fabric material in the form of triangular panels stitched together to form the rear crown portion of the hat sized to define an interior space in which a wearer's head is snugly received. Around the bottom of the crown portion, a small sweat band is stitched thereto so that there are layers of fabric material at the bottom of the crown portion. The bottom of the crown portion is interrupted by an opening at the rear thereof spanned by an adjustment strap for adjusting the crown portion to fit tightly on a wearers' head. The brim portion has a relatively thin, rigid insert, e.g. approximately an ⅛ of an inch thick, with fabric material sewn so as to extend tightly onto its upper and lower surfaces and around the brim outer edge including the front and side portions thereof. In this regard, the fabric has a pair of openings aligned with the notches through which the dome lenses of the LEDs can project, so that the light source of the present hat takes up very little space on the hat brim portions and remains unobtrusive for improved aesthetics. Electrical leads or wire interconnecting a power source attached to the crown portion to the LEDs are routed between the layers of fabric material of the crown portion, and between the brim insert and the fabric thereon. In this manner, the leads are concealed from view for substantially their entire length. Preferably, the leads are routed around the front edge of the hat brim so that any slight increase in brim thickness that they cause is substantially unnoticeable by an observer of a person wearing the hat, particularly since they can be located in the thicker area of overlap between upper and lower fabric coverings on the brim or slightly rearwardly spaced therefrom. The preferred location for the power source is at the back of the hat such as on the adjustment strap so that it is not noticeable to someone looking face-to-face at the hat wearer. The mounting of the power source to the strap is such that the power source does not project into the interior space. Instead, the crown interior space is kept free of any encumbrances associated with the power circuitry for the LEDs to maintain the crown's comfort and fit when being worn.

In a preferred form, the power source is in a compact module similar to the light modules although with the LEDs removed for being mounted in the front brim portion notches, as has been described. Because of the efficiency and intensity of the solid-state LEDs, the housing of the module has very compact dimensions as the power source can comprise thin, coin-cell batteries while still providing a very powerful light source for the hat. In this manner, the weight of the power module can be kept to a minimum so that there is little in the way of inconvenience to the person wearing the lighted hat herein.

The hat can be specifically adapted so that a field of view at typical reading distances (usually 10 to 18 inches from the wearer's eyes) is particularly well lit, although if the hat is mainly desired for other activities that do not require such a well-focused illuminated area, then such adaptation need not be provided. In fact, with the preferred high intensity LED lights described more fully hereinafter, areas extending hundreds of feet in front of the hat wearer and even up to a mile with optimum ambient conditions will be well lit with the lighted hat herein. This is true even with the lights directed as described above for providing enhanced lighting at typical reading distances. The present invention may be incorporated in a wide variety of either soft or rigid headgear, such as caps, hats or helmets having a forwardly extending member referred to as a bill, brim or visor. Examples of such headwear include soft sports caps, firemen's helmets (such as those made of composite material and having a distinctive traditional shape), hard hats or safety helmets of the impact resistant type (usually having an internal suspension, widely used at construction sites and other work locations), as well as less substantial protective headgear oftentimes referred to as bump caps.

As mentioned, high intensity lamps or lights and light mounts therefor can cooperate to light a "reading" area with a maximized amount of light provided in the reading distance range. More particularly, highly efficient and high intensity light-emitting diodes (LEDs) which are mounted either in the brim or in housings associated with the headgear, and which are configured to fix narrow beams of light directed slightly inward toward each other so that the beams overlap in the reading distance range thus providing double the amount of light for reading over that provided by a single one of the lights. If desired, however, the invention could be employed with a single light.

When lights are associated with housings, the housings are configured and attached adjacent outer portions of the brims or visors, so that the inwardly directed light beams light up the areas generally in the user's field of view. Further, the small size and efficient nature of the preferred solid-state material, e.g., InGaN (indium gallium nitride), for the LEDs, allows very small power supplies to be used such as disc-shaped coin cell batteries for powering the LED lamps which, in turn, allows both the light source and power source herein to be minimized in their number and size. The power source and light source can be self-contained in a highly compact housing or the light source can be removed from the housing to be fit in the brim notches. In this regard, the present invention also contemplates the provision of compactly sized lighting systems as described above that do not interfere with the user's activities or the comfort and fit of the hat when being worn, as previously described.

The preferred lamps employed herein are a small lightweight LED solid state devices that provide a very bright light, while consuming very little power. As such, the batteries enclosed in the housing are small and do not need to be changed as frequently as devices that utilize incandescent lights or fiber optics, which require large batteries. The LEDs provide a relatively narrow beam of light that can be well focused in a particular direction. For example, when two light sources are provided, the LEDs in each source are positioned such that the cones of light produced by the LEDs in the light sources begin intersecting at a point closely adjacent to or coinciding with the start of the range of ideal reading distances. As such, the illuminated reading portion receives the brightest light possible since the intersection of both cones of light are trained on that area. Another advantage of using the high intensity LEDs is that because they consume such a small amount of power, virtually no heat is dissipated. As such, the LEDs are well-adapted for the lighted hats herein as they do not generate the heat of incandescent bulbs so that they can be employed around the face of one wearing the light hat. Therefore, a user is able to wear headgear having the light modules incorporated therewith for longer periods of time without suffering from heat and without being bothered by the weight of the illumination devices.

DETAILED DESCRIPTION OF THE PREFERRED EMBODIMENTS

Figures 27, 28:
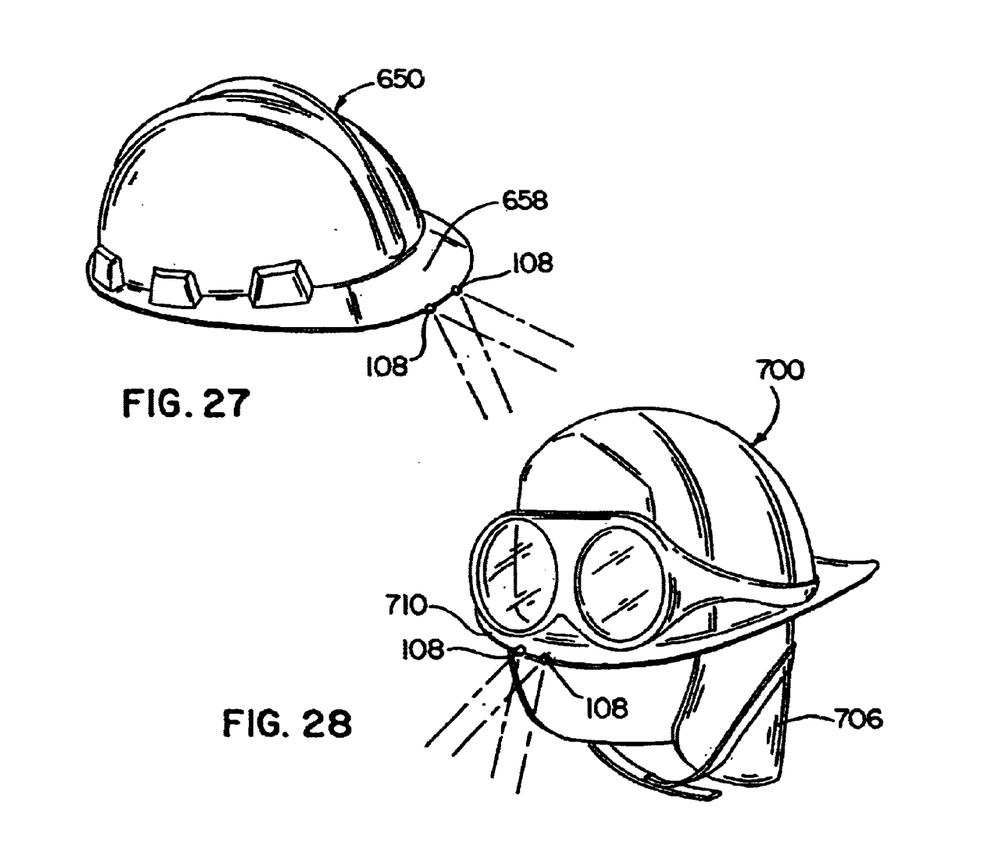
FIG. 27 shows construction hard hat headgear with integral illumination in accordance with the present invention.
FIG. 28 shows a composite firemen's helmet of traditional design, with integral illumination in accordance with the present invention.

As will be seen herein, the present invention is directed to a wide variety of headgear, preferably headgear having a forwardly extending member commonly referred to as a bill, brim or visor, referred to herein as a brim or brim portion. The brim extends forwardly from a head-fitting portion and is typically provided to shield the wearer from incident light bright enough to interfere with the wearer's vision. Brims are also provided to shield a wearer from rain or other objects such as leaves or other lightweight debris which may be falling about the wearer. When substantial contact is anticipated, the brims (and the remainder of the headgear, as well) may be made rigid so as to avoid deflection when impacted by more substantial objects. Over the years, a great variety of headgear with forwardly extending brims has been proposed and the present invention contemplates use with this great variety of headgear. For purposes of illustration and not limitation, the present invention is described with respect to a number of well-known headgear types. For example, in FIGS. 1–3 and 15 a soft athletic or sports cap commonly referred to as a "baseball cap" is shown. While the brim of the baseball cap is generally rigid or shape retentive, the crown is more flexible for a more relaxed fit on a persons' head. FIG. 27 shows a conventional "hard hat" or safety helmet according to principles of the present invention, while FIG. 28 shows a traditional composite firemen's helmet according to principles of the present invention. The present invention could also be implemented in a visor where the head fitting portion does not entirely cover the wearer's head like that of the crown of a baseball cap.

Figure 1:
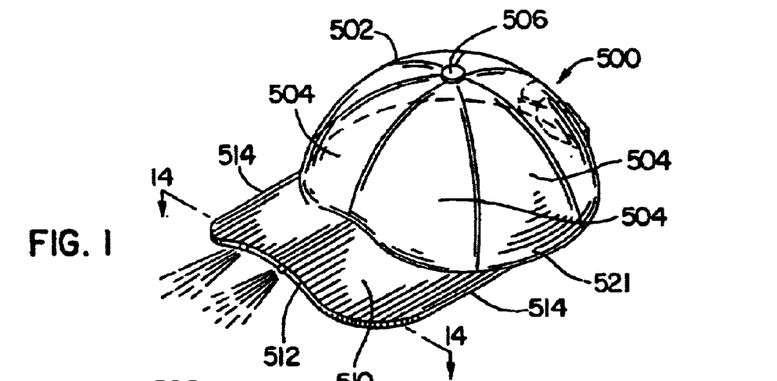
FIG. 1 is a perspective view of a lighted hat in accordance with the present invention showing LEDs at the front of a brim portion for directing light forwardly therefrom.
Figure 2:
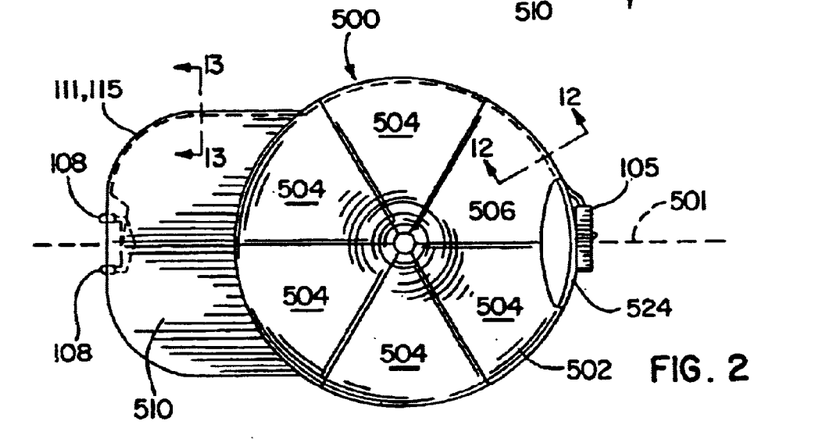
FIG. 2 is a top plan view of the lighted hat of FIG. 1 showing a rear mounted power module with leads interconnecting the LEDs and power module shown in phantom.
Figures 3, 15:
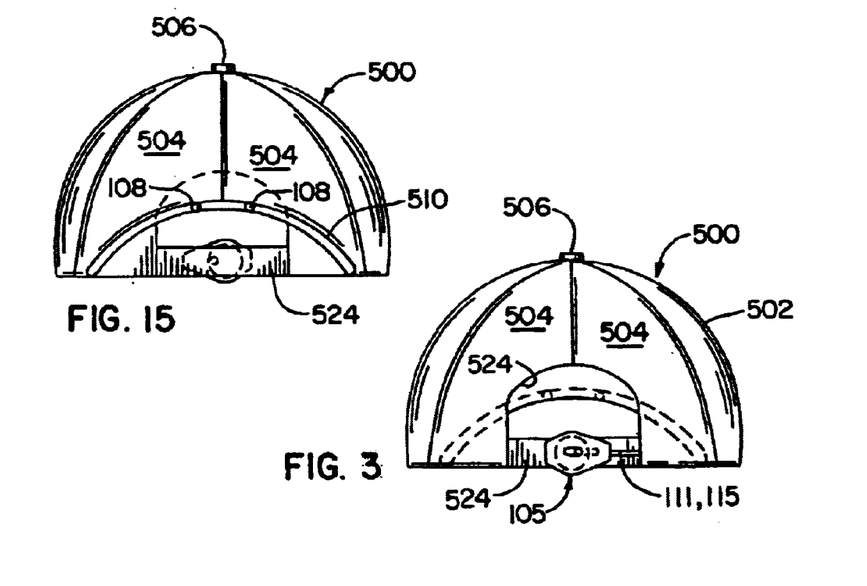
FIG. 3 is a rear elevational view of the lighted hat of FIG. 1 showing the power module attached to an adjustment strap of the hat.
FIG. 15 is a front elevational view of the hat of FIG. 1 showing the lateral spacing of the pair of LEDs across the front of the hat.
Figure 4:
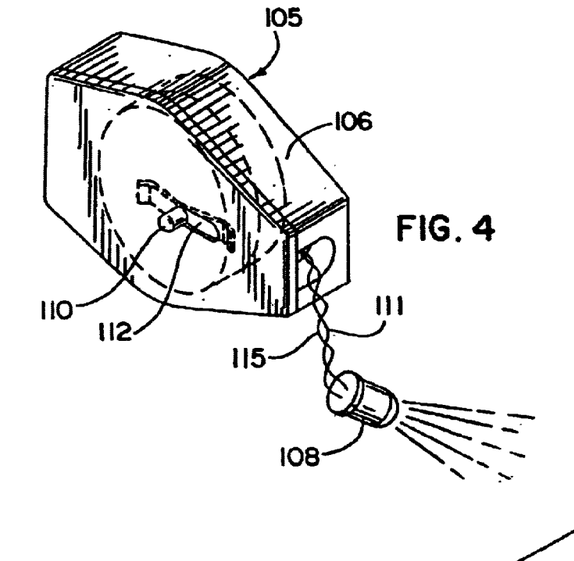
FIG. 4 is a perspective view of the power module showing a housing and slide switch actuator thereof.

Referring now to FIGS. 1–16 the invention is showed embodied in a baseball cap generally indicated at 500. Cap 500 is constructed with a soft head covering portion or crown 502 defining an interior space 502a for being placed onto a person's head and comprising a number of panels 504 sewn or otherwise joined together and terminating at a button 506. A brim 510 is joined to crown 502 so as to extend in a forward direction when the cap is fitted to the wearer's head. Brim 510 includes a forward peripheral edge 512 and continuously extending side edges 514. As seen in FIG. 15, brim 510 is illustrated as having a curved shape so as to be concave when viewed from below. If desired, brim 510 can have a flat or non-curved horizontal shape.

Figure 12:
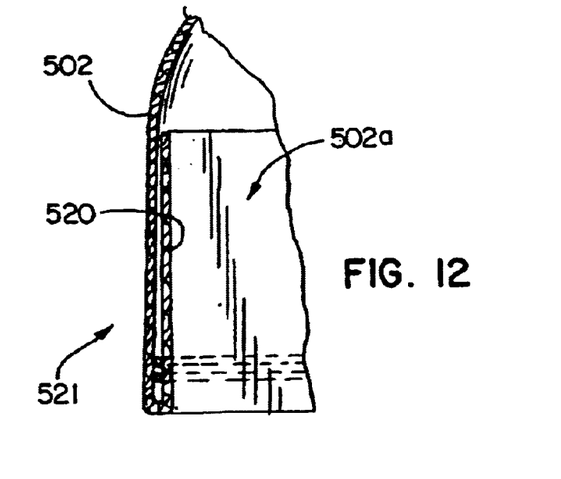
FIG. 12 is a fragmentary cross-sectional view taken along the line 12—12 of FIG. 2 showing layers of fabric at the bottom of the crown portion of the hat with the leads run therebetween.
Figure 13:
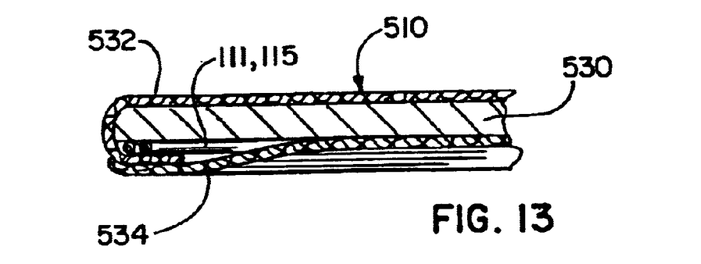
FIG. 13 is a fragmentary cross-sectional view taken along the line 13—13 of FIG. 2 showing the brim insert and fabric material secured on upper and lower surfaces thereof with the leads routed between the fabric and the lower surface of the brim insert.

Referring to FIG. 12, the lower portion 521 of crown 502 from which the brim 510 projects has an inner band 520 which may be employed as a stiffening member and/or as a sweatband. In this matter, the crown 502 has two layers of material, specifically along the lower, large diameter portion 521 thereof. Referring to FIG. 3, the back of crown 502 has an opening 524. A conventional adjustment band or strip 526 spans opening 524 and provides an adjustable girth to fit wearers having different head sizes. Visible in FIG. 3 is a housing 105, shown for example in FIG. 4, which is attached to adjustable band 524 using conventional means such as rivets or adhesives. A pair of wire conductors 111, 115 extend from housing 105, traveling through the space between inner band 520 and the lower portion 521 of crown 502, as can be seen in FIG. 12. With reference to FIG. 13, the conductors 111, 115 extend within brim 510, i.e. between stiff core or insert 530 and attached fabric material, such as along one of the side edge portions 514 and the forward edge portion 512 to the rear of a pair of lights or lamps 108 (FIG. 2).

Figure 24:
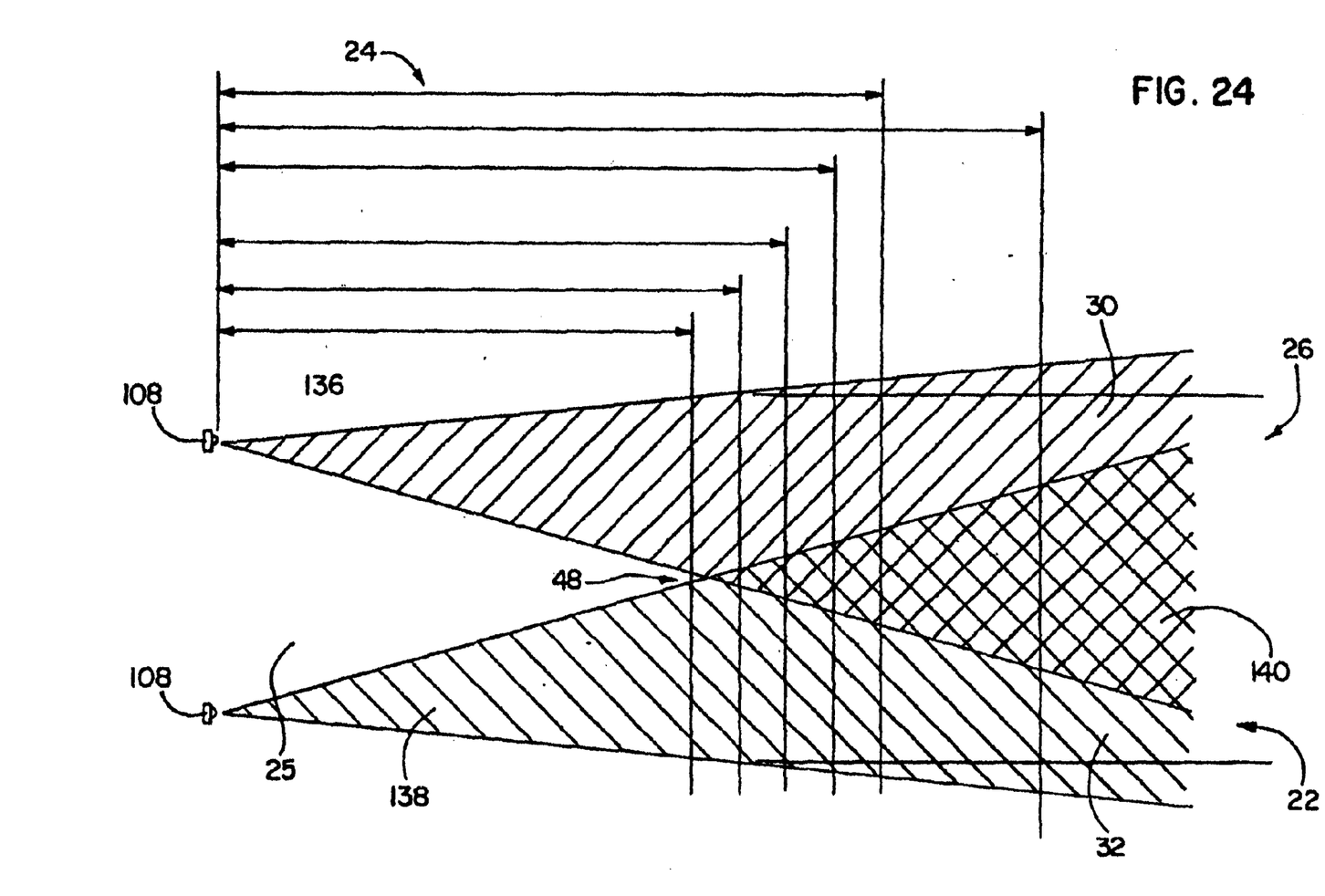
FIG. 24 is a diagrammatic view showing inwardly directed cones of light as an optional form of the invention herein.

Although not required, it is generally preferred that the lights 108 are provided in pairs, with each pair being aligned in a particular manner so as to optimize the wearer's viewing at reading distances, as pointed out above. Generally speaking, the lights 108 employed in the headgear are aimed so as to be canted horizontally inwardly from generally parallel tracks extending from the wearer's face and on either side of fore and aft extending centerline 501 of the hat 500. The lights are also aimed slightly downwardly to account for the distance of the lights above the wearer's eyes. This orientation causes the lighted areas of the lights to overlap one another and to create an overlapping lighted area having a significantly increased brightness, as compared to illumination provided by a less preferred arrangement using a single one of the lights 108. As shown in FIG. 24, the overlapping lighted area can be disposed in a predetermined reading distance range generally indicated at 24 when the hat is adapted for use as a reading aid in dimly lit areas. This range for a normal functioning eye with any necessary corrective lenses allows a wearer to read 10 or 12-point font at a normal reading distance range of approximately 10 to 18 inches in front of the wearer's face.

The lights 108 are preferably high intensity lights or LEDs that form their lighted areas as narrow light beams in the shape of respective cones 136 and 138 of light directed inwardly toward each other, as shown in FIG. 24. In this manner, the point of intersection 48 will be closely adjacent or substantially coincident with the start of the reading distance range 24 and the overlapping area will likewise take on a conical shape 140 and be maximized in size in the range 24. There is also a proximate conical area 25 right in front of the wearer that does not receive light. However, this unlighted area 25 is of little consequence as it substantially falls before the start of the reading distance range 24.

With the preferred solid state material for the LEDs 108 as described hereinafter, the lamps will generate a narrow light beam cone 136, 138 of twenty degrees. For this narrow cone 136, 138, the oblique inward cant angle 46 is preferably approximately fifteen degrees so that the point 48 of intersection where the overlap lighted area 22 begins, is centrally disposed between the lenses 12 and spaced forwardly therefrom approximately at the start of the reading distance range 24. This inward canting of the light beam cones 136 and 138 also minimizes the amount of light that is projected to lateral areas outside the field of view 26 forwardly of the lights 108 and the brim front edge 512 at which they are disposed.

The LEDs 108 are a preferably high-intensity white LED, such as manufactured by Chicago Miniature Lamp, Inc., of Hackensack, N.J., part number CMD333UWC-ND. Similar types of LEDs are available from a variety of manufacturers and such LEDs would also be acceptable for use in the light module 105. A particular advantage of using the described high-intensity LEDs such as of InGaN material is the ability of the LEDs to provide large amounts of bright light while consuming significantly less power than incandescent light sources and fiber optic devices. In particular, the LED lamp 108 provides a typical 2300 mcd light output using only 20 mA of power. This allows for significantly extended battery life using inexpensive and lightweight batteries. A further advantage of this type of LED is the relatively narrow viewing angle of approximately 20 degrees. This allows the light output to be directed in a very precise manner, making it ideally suited for use in the present invention. Referring in particular to FIG. 3, it can be seen that the angle of the LED 108 causes the cone of light to be emitted at a specific angle so that the light is directed slightly inward toward the portion being read and thereby avoiding scattering of light outwards and particularly outside the wearer's field of view.

By canting the light beams 136 and 138 inwardly, little light is wasted on areas that are outside the wearer's effective field of view. Further, the conical overlap area 140 that receives double the amount of light increases in size with increasing viewing distances. By contrast, the peripheral areas 30 and 32 on either side of the double-lit overlap area 140 become smaller with increasing reading. Since light dissipation can become an issue as distances increase from the light source, the increasing size of the double-lit area 22 in comparison to the decreasing size of the single-lit areas 30 and 32 provides a significant advantage in having a very well-lit reading area with an efficient use of the light generated by the LEDs 108 herein. Further, the fixed canting and downward deflection of the beams 136 and 138 allows a user to put on the headgear knowing that they will be able to begin viewing even in dimly-lit areas by simply turning on the lights 108 without requiring that they be adjusted for focusing them on the material to be read.

Figure 14:
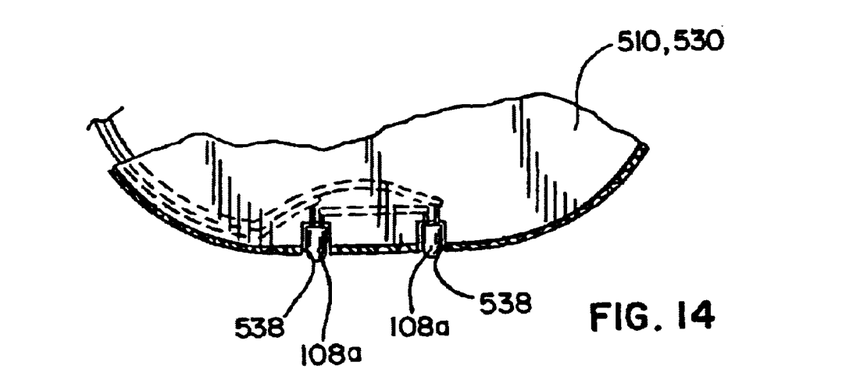
FIG. 14 is a fragmentary cross-sectional view taken along the line 14—14 of FIG. 1 showing notches in the brim insert and aligned openings in the fabric with the LEDs secured therein.

With reference to FIGS. 2 and 13, brim 510 of the preferred embodiment preferably comprises a core 530 of rigid or semi-rigid material, such as plastic or paper board with conventional fabric coverings 532, 534. If desired, fabric covering 534 can be of a conventional glare-reducing material so as to prevent aggravated reflection of light toward the wearer's eyes. As shown in FIG. 14, notches or openings 538 are formed in core layer 530. Notches 538 are dimensioned so as to snugly receive the lights 108 with the brim fabric material including a pair of small cut-out openings aligned with the notches 538 to allow the lenses 108a to project therethrough, as shown in FIG. 14. As mentioned, lights 108 preferably comprise high-intensity LEDs having a conventional translucent or transparent plastic lens body 108a. As can be seen in FIG. 14, the plastic bodies or dome lenses 108a of lights 108 have a length in the direction extending along their central axis. The notches 538 are preferably sized for a tight fitting relationship with the bodies of lights 108 to have a width thereacross approximately the same or slightly larger that the diameter of the lenses 108a and a depth that is less than the length of the lenses so that approximately half or less of the length of the lenses 108a project forwardly beyond the notches 538 and aligned fabric openings. Preferably, the notches 538 and aligned fabric openings are carefully formed so as to provide the desired downward deflection and inward angling or canting of the lights, as mentioned above. The lights 108 can be affixed to the brim core 530 in the notches using conventional fastening arrangements, such as adhesive. As can be seen for example in FIG. 15, the lights 108 have a relatively small size or diameter of their lenses, preferably close to the thickness of the brim core. By way of example and not limitation, the dome lenses can have a length of less than approximately 0.375 inch and a diameter of approximately 0.1875 inch with the brim insert having a thickness of approximately 0.125 inch. This allows the fabric covering the brim core to be dressed in a conventional manner and without a significantly visible alteration to the normal configuration of the hat brim 510.

To further reduce the intrusiveness of the present hat lighting system, the leads 111, 115 are run in the brim portion 510 in the area of overlap between the upper and lower fabric layers or coverings 532 and 534, as can be seen in FIG. 13. As shown, these coverings 532 and 534 are typically attached as by sewing to each other toward the front edge portion 512 of the brim 510 and along the bottom thereof. Accordingly, there is a slight bump where this attachment seam is sewn that depends from the bottom of the brim 510 in conventional hats. By having the leads 111, 115 disposed in this overlap area or slightly rearwardly spaced therefrom, then any relative increase in thickness due to the diameter of leads 111, 115 is minimized and will not be readily noticeable to an observer given the normal presence of a bump due to the overlap of the fabric coverings 532 and 534 along the bottom and front portion of the brim as in a conventional baseball cap.

Figure 19:
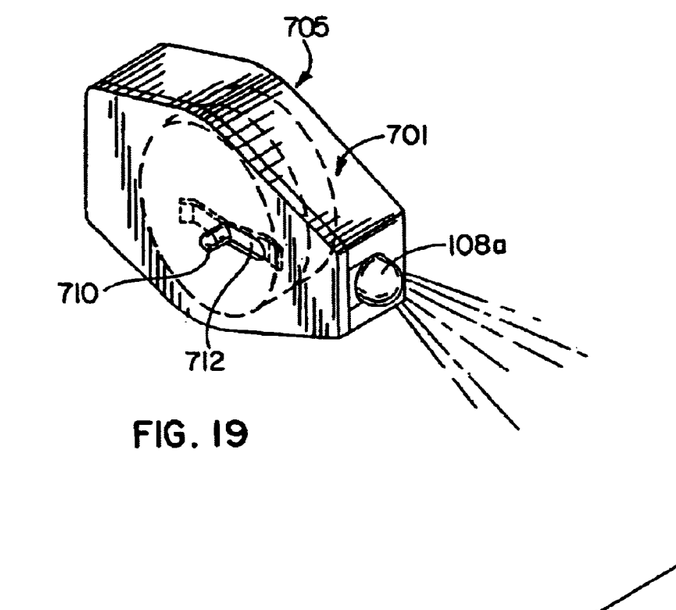
FIG. 19 is a perspective view of one of the light modules employed with the headgear of FIG. 17.

Referring now to FIGS. 3 and 19, housing or light module 105 is of a compact size, so as to be conveniently mounted to the adjustment band of the head gear. Generally speaking, housing 105 comprises an interruptible power source, including a power source and switching capability for desired interruptible energizing of lights 108. Housing 105 contains at least one, and preferably two, small disc-shaped battery power supplies 116 in a space savings manner therein. The housings 105 can be constructed of two halves or cover members 106 and 107.

Turning now to FIGS. 4–11, the light module 105 is shown in isolation from the headgear. As can be seen in greater detail, the light module 105 houses a switch 114 having an actuator projecting portion 110. The projecting portion 110 is designed such that a user's thumb or finger can quickly and easily engage the projecting portion 110 to push the switch 114 for sliding in either one of two directions to turn the light module off and on. The elongated slot 112 is sized such that the switch 114 can be moved only a preset distance, thereby enabling the on and off functions to be accomplished with a minimum of motion. When the switch 114 is moved to the "on" position, a set of batteries 116 energize the LED 108. Similarly, when the switch 114 is moved to the "off" position, the connection between the batteries 116 and the LED 108 is broken and the LED 108 is turned off.

Figure 5:
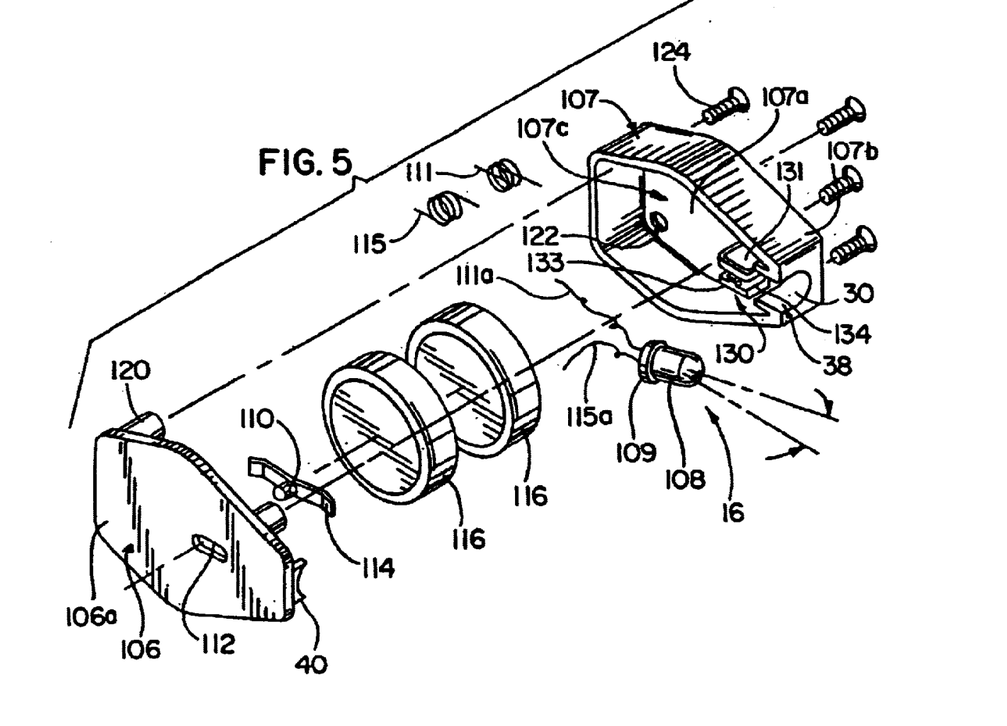
FIG. 5 is an exploded view of the power module configured to carry an LED and showing thin, coin-cell batteries contained in the housing.
Figures 6, 7, 8:
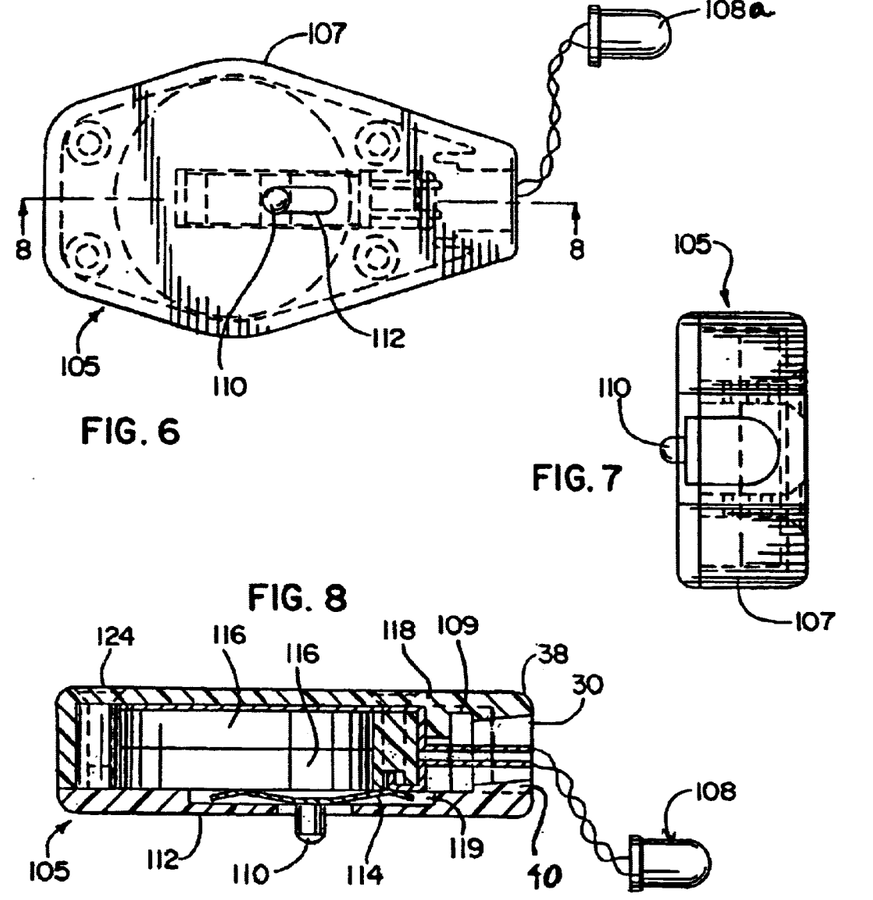
FIG. 6 is a top plan view of the power module of FIG. 4.
FIG. 7 is a front elevational view of the power module showing an opening through which the electrical leads are run.
FIG. 8 is a cross-sectional view taken along the line 8—8 of FIG. 6 showing the stacked coin-cell batteries in the housing.
Figure 9:
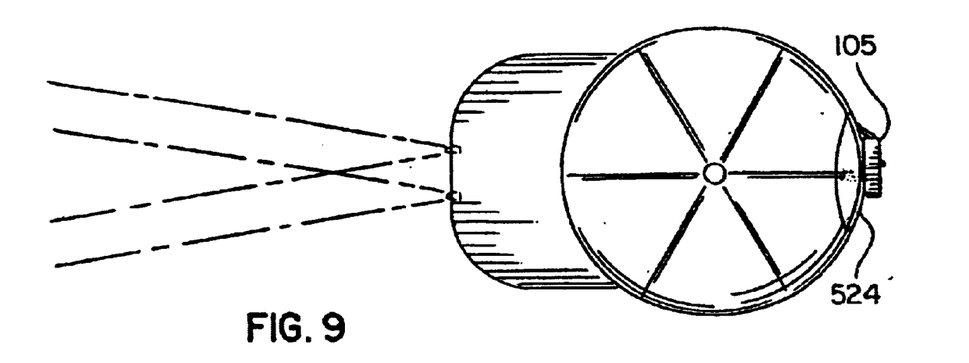
FIG. 9 is a top plan view of the headgear showing operation of the LEDs incorporated therewith with the LEDs being laterally spaced on either side of the fore and aft extending centerline of the hat.

Referring to FIG. 5, an exploded perspective view of the light module 105 is shown. The light module 105 comprises a housing body 109 that is preferably constructed of a lightweight material, such as plastic, to provide the greatest amount of comfort to the wearer, while still being a cost-effective product. The housing body 109 includes a first cover member 106 and a second cover member 107. The second cover member 107 is formed with a main flat wall 107a from which upstanding walls 107b extends from the periphery thereof to form an interior space 107c in which the switch 114, and batteries 116 are disposed. The fastening devices 124, which may be self tapping screws among others, are used to fasten the first cover member 106 as a lid onto the second cover member 107.

The first cover member 106 is formed with an elongated slot 112 cut out of the main flat wall 106a, several integral projecting bosses 120 that can be internally threaded for receiving fastening members or screws 124. As described above, the elongated slot 112 is designed to receive the projecting portion 110 of a switch 114 such that the projecting portion 110 extends slightly outside the first cover member 106 and is accessible by a user's finger or thumb. The cover member 106 also is formed having a slot 119 (FIG. 8) to form a housing for the switch 114 when the light module is fully assembled.

The LED 108 includes anode 111a and cathode 115a leads that are used to energize the LED 108. In addition, the anode 111a and cathode 115a leads are physically configured to also enable the LED 108 to be securely held in position within brim 510. As mentioned above, electrical conductors 111, 115 extend from lights 108 to housing 105, located at the rear of the headgear (see FIG. 2). The conductors 111, 115 extend through an opening in the forward wall 30 of cover member 107. The leads 111, 115 extend to respective apertures formed in box shaped member 130. The box shaped member 130 serves as a lead guide assembly which channels or guides the anode 111 lead and the cathode 115 lead into their respective appropriate positions for conducting and switching functions. The guide assembly 130 includes an extending sidewall 131 and an extending support structure which includes first 133 and second 134 indents and a block oriented between the first 133 and second 134 indents. A large portion of the anode 111 lead extends beyond the sidewall 131 and into the cover member 107 opening. The cathode 115 lead is in a bent hook configuration is placed into the support structure 132 such that the portion of the lead that is connected to the remotely located LED 108 is situated in the second 134 indent and the hooked portion engages the first 133 indent. The block mentioned above forces part of the lead 115 lead to extend beyond the support structure 132 to enable contact between the batteries 116 and the lead 115 via the switch 114.

The second cover member 107 also includes several apertures 122 for receiving the fastening devices 124. The fastening devices 124 are inserted into apertures 122 and engage the fastening receiving members 120 of cover member 106. The apertures 122 in the second cover member 107 are preferably countersunk such that the heads of the fastening devices 124 sit flush with the surface of the second cover member 107. Furthermore, by providing a standard phillips or slot headed fastening device, a user is able to gain access to the interior of the light module using a simple, commonly found household screwdriver. Once inside, the user self-services the light module 105 and, in particular, replaces the batteries 116 when they are exhausted.

The batteries 116, because of the low power consumption of the high-intensity LEDs 108, may be any commonly found small form factor batteries, such as three volt coin cells manufactured by Panasonic Corporation of Japan, part no. P189D. To this end, the disc-shaped batteries preferably have a diameter of slightly greater than three-fourths of an inch and a width of approximately one-eighth of an inch so that two batteries 116 can be stacked in a compact fashion. Accordingly, with the small LED 108 and the small and thin batteries 116, the housings 109 can be constructed in a very compact fashion. By way of example and not limitation, the main housing walls 106a and 107a have a maximum width of less than approximately one-inch. Since neither the batteries 116 or the LED 108 is particularly long, and the stroke of the switch 110 in minimized as previously described, the length of the housing 109 can be minimized to be on the order of approximately one and one-half inches. Finally, since the batteries 116 are so thin, the depth of the housing 109 can be sized to be slightly greater than the thickness of the two stacked disc batteries 116 or less than approximately one-half inch.

When assembled, the batteries 116 are stacked together such that the negative terminal of the first battery is an electrical contact with the positive terminal of the second battery. The positive terminal of the first battery 116 is then placed in electrical contact with the lead 111. The switch 114 which is constructed of an electrically conductive lightweight metal strip rests solely on the negative terminal of the second battery when the light module is not producing light, resulting in an open circuit. When the switch 114 is placed in its "on" position, an electrical connection is created between the negative terminal of the battery 116 and the depending hooked portion of the lead 115. Thus the circuit from the positive terminal of the battery 116 to the leads connecting light or LED 108 is completed using the switch 114, and the LED 108 illuminates. The projecting portion 110 may be integrally formed as part of the metal strip or may be a plastic or metal projection that is fastened at an appropriate position in the body of the switch 114. The body of the switch 114 is constructed such that the metal strip includes one or more inclines formed by bends in the metal strip of the switch. The inclines are sized to cause the switch 114 to fit relatively tightly between the battery and the housing much like a spring, thereby enabling the switch to maintain it's on or off position into which it has been placed.

Figure 10:
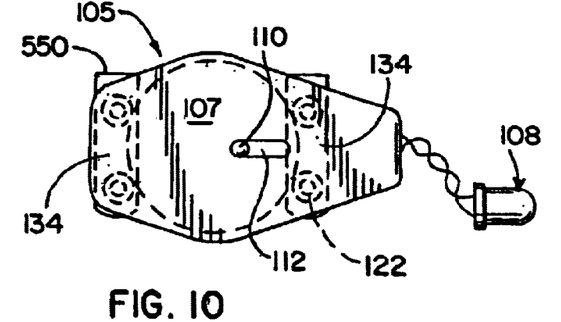
FIG. 10 is a top plan view of the power module similar to that of FIG. 6 but having spring clips shown in phantom, for mounting to the headgear.
Figure 11:
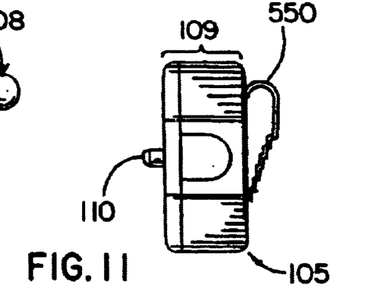
FIG. 11 is a front elevational view of the power module showing one of the spring clips.

Referring to FIGS. 10 and 11, the housing 105 is shown fastened to an optional spring clip 550 which allows housing 105 to be removably secured to adjustment band 524. This allows the housing to be removed for a more easy access to the interior of the housing. If desired, the electrical conductors 111, 115 can be coupled to circuitry within the housing using a conventional plug and socket arrangement. In the most preferred embodiment, it has not been found necessary to provide removable securement of the housing to the adjustment band, although such can be readily provided, if desired.

As will be appreciated from the above, the routing of electrical conductors 111, 115 is accommodated largely by the bottom portion of crown 502, and the peripheral edge of brim 510, as can be seen in FIG. 2. Accordingly, it is not required that the electrical conductors 111, 115 be particularly flexible, although flexibility would provide advantages if the headgear were expected to be folded or bent. The present invention contemplates headgear which is both flexible and foldable as the baseball cap illustrated in FIGS. 1–3, as well as, relatively rigid headgear such as the rigid shell structure typically associated with helmets, such as the construction helmet of FIG. 27 and the firemen's helmet of FIG. 28.

Figure 16:
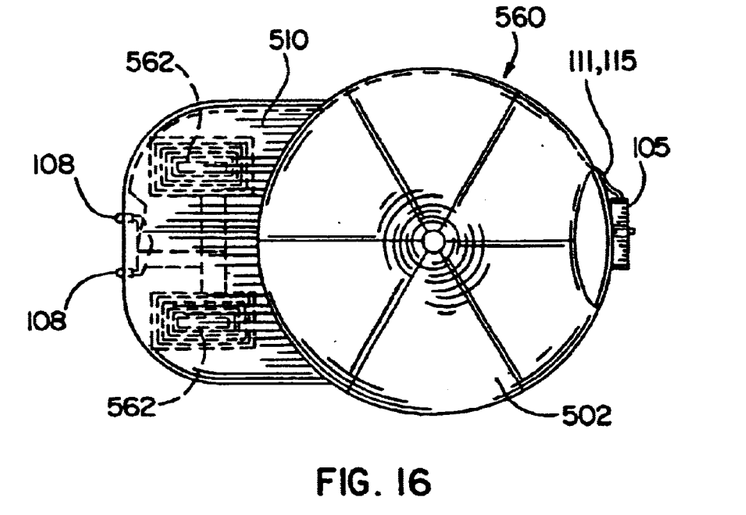
FIG. 16 is a top plan view similar to that of FIG. 2 but showing added solar cell devices in the brim portion of the hat.
Figure 17:
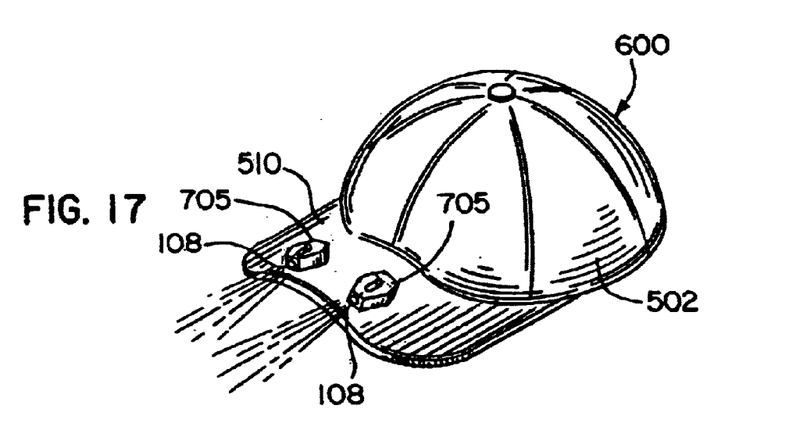
FIG. 17 is a top plan view of another embodiment of alighted hat in accordance with the present invention showing small, self-contained light modules mounted on the brim portion of the hat for projecting light forwardly therefrom.
Figure 18:
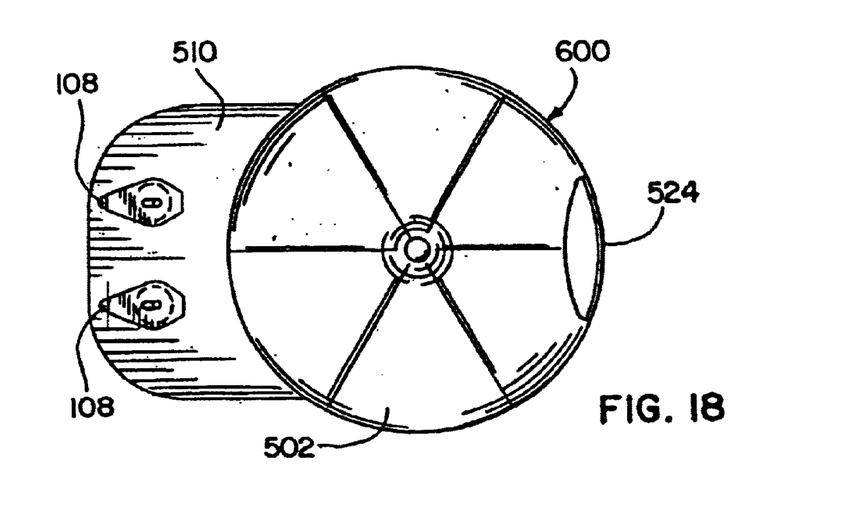
FIG. 18 is a top plan view of the lighted hat of FIG. 17 showing the position of the lights adjacent the front edge of the brim portion.

Referring now to FIG. 16, an alternative embodiment of a baseball cap headgear is indicated at 560. Cap 560 is substantially identical to the cap 500 described above, except for the addition of at least one, and preferably two photovoltaic solar cells 562, one for each LED 108. The cells 562 are carried on an external surface of the cap 500, such as shown carried by brim 510 in FIG. 16. It is generally preferred that the photovoltaic cells be located on top of brim 510 so as to receive incident solar energy which is converted to electrical energy to either drive lights 108 directly or to charge batteries within housing 105. It is generally preferred that photovoltaic cells be of a thin, flexible or semi-flexible construction, such as a printed circuit film or the like.

Turning now to FIGS. 17–26, an alternative embodiment of baseball cap headgear is indicated at 600. Construction of the headgear elements is the same as indicated above and includes the crown 502 and brim 510 as described above. Cap 600 differs from cap 500 in that housing 105 and wiring between the housing and the lights 108 is omitted. Instead, the lights 108 are mounted in their own respective housings or light modules 705. The light modules 705 are secured to brim 510 using conventional fastener arrangements. The modules are preferably fixedly attached to brim 510 in order to provide a desired lighting pattern for the wearer, at common reading distances. If desired, the light modules 705 can be pivotally mounted on brim 510 using the arrangements to be described below with reference to FIGS. 25 and 26.

As will be seen herein, the light modules 705 are completely self-contained and separate one from the other. Each light module 705 includes a light 108, an interruptible energy source for powering the light and a switch for selectively disconnecting the power source when illumination is not required.

Turning now to FIG. 19, the light module 705 is shown in isolation from the headgear. As can be seen in greater detail, the light module 705 houses a switch 714 having an actuator projecting portion 710. The projecting portion 710 is designed such that a user's thumb or finger can quickly and easily engage the projecting portion 710 to push the switch 714 for sliding in either one of two directions to turn the light module off and on. The elongated slot 712 is sized such that the switch 714 can be moved only a preset distance, thereby enabling the on and off functions to be accomplished with a minimum of motion. When the switch 714 is moved to the A "on" position, a set of batteries 716 energize the LED 108. Similarly, when the switch 714 is moved to the A "off" position, the connection between the batteries 716 and the LED 108 is broken and the LED 108 is turned off.

Figure 20:
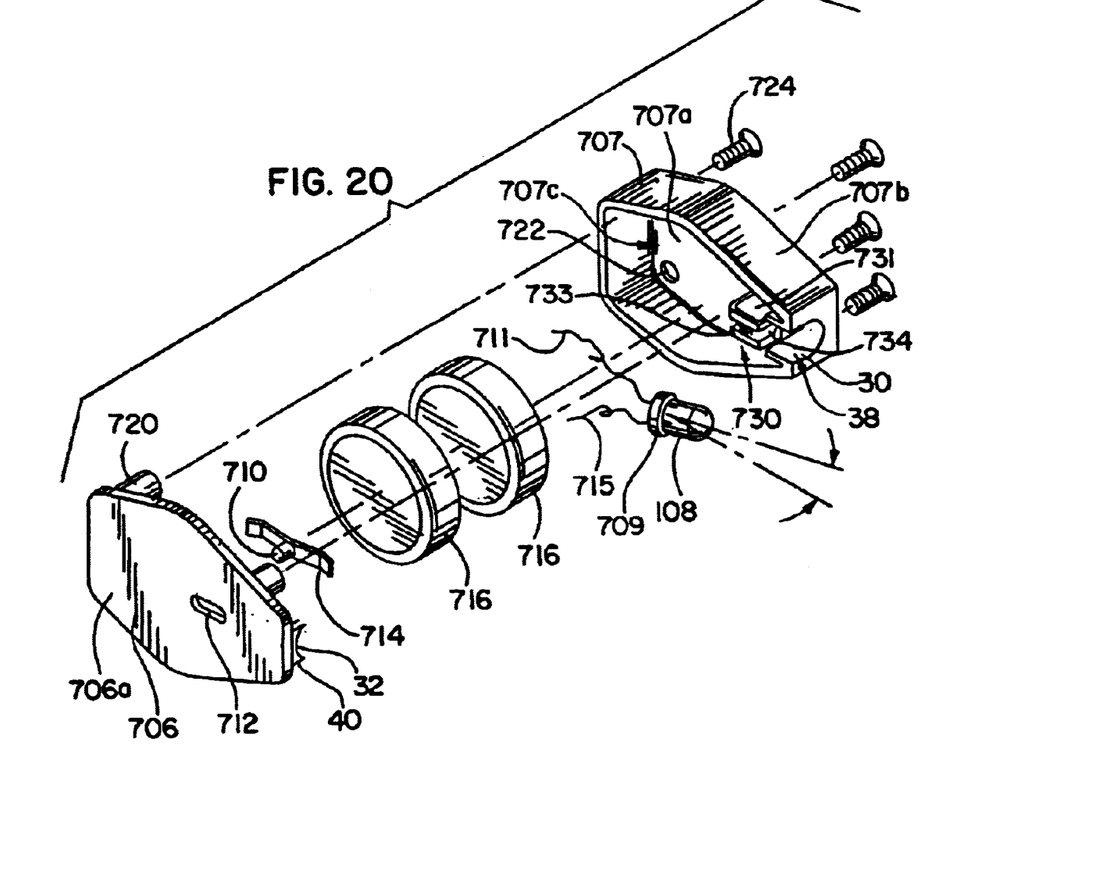
FIG. 20 is an exploded perspective view of the light module.
Figures 21, 22, 23, 23A, 25, 26:
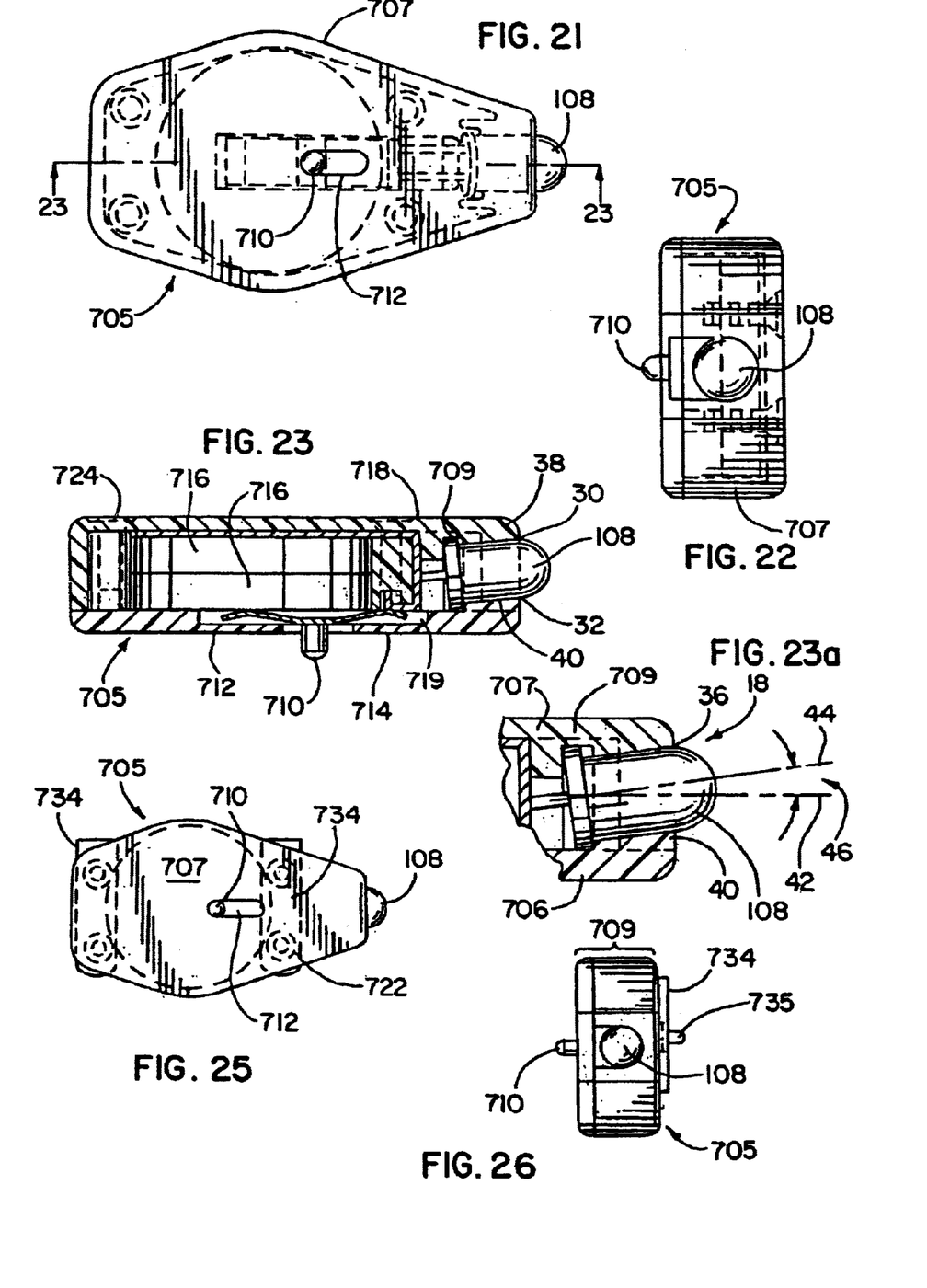
FIG. 21 is a top plan view thereof.
FIG. 22 is an end view thereof.
FIG. 23 is a cross-sectional view taken along the line 23—23 of FIG. 21.
FIG. 23a is a fragmentary cross-sectional view showing an enlargement of the right-hand portion of FIG. 23 including the configuration of the mounting surfaces for the LED for canting light projected therefrom relative to the housing longitudinal axis.
FIG. 25 is a top plan view of a light module similar to that of FIG. 21 but having a swivel or pivoting base.
FIG. 26 is a front elevational view thereof.

Referring to FIGS. 20–22, FIG. 20, an exploded perspective view of the light module 705 is shown. The light module 705 comprises a housing 701 that is preferably constructed of a lightweight material, such as plastic, to provide the greatest amount of comfort to the wearer, while still being a cost-effective product. The housing 701 includes a first cover member 706 and a second cover member 707. The second cover member 707 is formed with a main flat wall 707a from which upstanding walls 707b extend from the periphery thereof to form an interior space 707c in which the switch 714, the batteries 716 and the LED 108 are disposed. The fastening devices 724, which may be self tapping screws among others, are used to fasten the first cover member 706 as a lid onto the second cover member 707.

The first cover member 706 is formed with an elongated slot 712 cut out of the main flat wall 706a, several integral projecting bosses 720 that can be internally threaded for receiving fastening members or screws 724 and an integral LED positioning member or raised rib 40. The LED positioning member 40 extends toward the cover 707 and has a concave surface 32 that cooperates with curved surface 30 of the cover member 707 for capturing the LED dome lens 108a at the desired down angle. The desired downward angle (see FIG. 24) is set by the angle of the housing mounting. A fixed or adjustable housing mounting can be used. As described above, the elongated slot 712 is designed to receive the projecting portion 710 of a switch 714 such that the projecting portion 710 extends slightly outside the first cover member 706 and is accessible by a user's finger or thumb. The cover member 706 also is formed having a slot 719 (FIG. 23) to form a housing for the switch 714 when the light module is fully assembled.

The LED 108 includes anode 711 and cathode 715 leads that are used to energize the LED 108. In addition, the anode 711 and cathode 715 leads are physically configured to also enable the LED 108 to be securely held in position within the light module 705. The cathode 715 lead, which is generally the shorter of the two leads, is trimmed further to a size suitable for engaging an aperture 713 in a box shaped member 730. The trimmed cathode 715 lead is bent into a curved hook configuration to behave as a resilient spring clip when mounted into the light module 705; and the anode lead is left in its original form and engages a second aperture in the box shaped member 730, which enables the anode 711 lead to extend into the open portion of the second cover member 707, as further discussed below.

The second cover member 707 includes a LED positioning member or rib 38 having curved surface 30 formed thereon for cooperating with surface 32 to capture the LED dome lens 108a, as previously described. A lead guide assembly 730 is disposed within cover member 707. The guide assembly 730 channels or guides the anode 711 lead and the cathode 715 lead into their respective appropriate positions for conducting and switching functions. The guide assembly 730 includes an extending sidewall 731 and an extending support structure 732. The support structure 732 includes first 733 and second 734 indents and a block 735 oriented between the first 733 and second 734 indents. When the LED 108 is placed into position in the guide assembly 730, the anode 711 lead is placed into the channel between the extending sidewall 731 and extending support structure 732. A large portion of the anode 711 lead extends beyond the sidewall 731 and into the cover member 707 opening. The cathode 715 lead, which is in a bent hook configuration is placed into the support structure 732 such that the portion of the cathode that is connected to the LED 108 is situated in the second 734 indent and the hooked portion engages the first 733 indent. The block 735 forces part of the cathode 715 lead to extend beyond the support structure 732 to enable contact between the batteries 716 and the cathode 715 via the switch 714.

The second cover member 707 also includes several apertures 722 for receiving the fastening devices 724. The fastening devices 724 are inserted into apertures 722 and engage the fastening receiving members 720 of cover member 706. The apertures 722 in the second cover member 707 are preferably countersunk such that the heads of the fastening devices 724 sit flush with the surface of the second cover member 707. Furthermore, by providing a standard phillips or slot headed fastening device, a user is able to gain access to the interior of the light module using a simply, commonly found household screwdriver. Once inside, the user self-services the light module 705 and, in particular, replaces the batteries 716 when they are exhausted.

The batteries 716, because of the low power consumption of the high-intensity LEDs 108, may be any commonly found small form factor batteries, such as three volt coin cells manufactured by Panasonic Corporation of Japan, part no. P189D. To this end, the disc-shaped batteries preferably have a diameter of slightly greater than three-fourths of an inch and a width of approximately one-eighth of an inch so that two batteries 716 can be stacked in a compact fashion. Accordingly, with the small LED 108 and the small and thin batteries 716, the housings 701 can be constructed in a very compact fashion. By way of example and not limitation, the main housing walls 706a and 707a have a maximum width of less than approximately one-inch. Since neither the batteries 716 or the LED 108 is particularly long, and the stroke of the switch 710 in minimized as previously described, the length of the housing 709 can be minimized to be on the order of approximately one and one-half inches. Finally, since the batteries 716 are so thin, the depth of the housing 709 can be sized to be slightly greater than the thickness of the two stacked disc batteries 716 or LEDs than approximately one-half inch.

When assembled, the batteries 716 make contact with the anode or elongated portion 711 of the LED 108. The batteries 716 are stacked together such that the negative terminal of the first battery is an electrical contact with the positive terminal of the second battery. The positive terminal of the first battery 716 is then placed in electrical contact with the elongated portion 711 of the LED 78. The switch 714 which is constructed of an electrically conductive lightweight metal strip rests solely on the negative terminal of the second battery when the light module is not producing light, resulting in an open circuit. When the switch 714 is placed in it's an "on" position, an electrical connection is created between the negative terminal of the battery 716 and the depending hooked portion 715 of the LED 108. Thus the circuit from the positive terminal of the battery 716 to the LED 108 is completed using the switch 714, and the LED 108 illuminates. The projecting portion 710 may be integrally formed as part of the metal strip or may be a plastic or metal projection that is fastened at an appropriate position in the body of the switch 714. The body of the switch 714 is constructed such that the metal strip includes one or more inclines formed by bends in the metal strip of the switch. The inclines are sized to cause the switch 714 to fit relatively tightly between the battery and the housing much like a spring, thereby enabling the switch to maintain its on or off position into which it has been placed.

Referring to FIGS. 23 and 23a, the light module is shown in its assembled form. The LED positioning member 40 of the cover member 706 presses against the body of the LED 108 and pushed the LED 108 into a canted position within the housing 705. A particular advantage in such a configuration is that the LED is able to project light at a precise pre-determined angle. Referring in particular to FIG. 23a, it can be clearly seen that the base 709 of the LED 108 helps to hold the LED 108 in place within the housing 701. The LED positioning member 40 is angled to a degree such that the top of the LED 108 is pushed against the second cover member 707 and particularly the positioning rib 38 thereof.

Turning now to FIG. 24, the lights of modules 705 are shown in operation. The canted positioning of the LEDs 108 in each of the light modules 705 cooperate to create an overlapping zone 140 of their respective cones of light 136, 138 in the desired reading range. In particular, because of the twenty-degree viewing angle of the LEDs 108, and their precise cant by setting the angular position of housing 707, the overlap area 140 occurs within a range of reading distances. As a result, the incidence of stray light is reduced and the amount of light illuminating the reading surface is maximized, as previously described.

Referring to FIGS. 25 and 26, the light module 705 is shown with a pivot mount 734 attached to the second cover member 707. The mount 734 may be manufactured of any strong resilient materials such as a high impact ABS plastic or metal, such as stainless steel. A rivet 735 or other pivot member movably attaches the mount to the brim, allowing slight inward canting adjustments to obtain the desired illumination pattern, such as that shown in FIG. 24.

Turning now to FIG. 27, headwear according to principles of the present invention is generally indicated at 650. Headwear 650 includes a "hard hat" or "protective hat" of conventional construction comprising a rigid plastic shell and an inner energy-absorbing liner in the form of a suspension device. The shell includes an outwardly extending visor or brim 658 that shields or shades the wearer's eyes. The plastic shell may be made of conventional materials such as polycarbonate or polyethylene. The underside of brim 658 may be covered with a glare-reducing paint coating or paper application. A pair of lights 108 is mounted in notches formed in brim 658, in the manner similar to that described above with reference to FIG. 14. As with the arrangement of FIG. 14, the brim 658 has notches formed for close-fitting engagement with the preferred light-emitting diodes comprising the lights 108. Notches formed in brim 658 are inwardly angled or canted to provide a desired illumination pattern, such as that described above with reference to FIG. 24. Lights 108 are secured in the conventional manner to brim 658 as by adhesive. Electrical wiring extends from lights 108 through an inner band in the manner indicated above in FIG. 12, to a housing 105 fixedly attached at the rear of the shell.

Turning now to FIG. 28, an alternative embodiment of headwear according to principles of the present invention is generally indicated at 700. Headwear 700 includes a conventional shell of a well-known design used by fire fighters. Also included with headwear 700 is an optional flexible neck guard 706, an inner band and impact-resisting suspension not visible in the figure. Shell 700 includes a brim 710 in which are mounted a pair of lights 108, in the manner indicated above in FIG. 14. Close-fitting notches are formed in brim 710, sized for close-fitting engagement with the preferred LED bodies of lights 108. Close-fitting arrangement guides the direction of light emitted from lights 108 in a carefully defined predetermined direction. Most preferably, the lights 108 are guided by the close-fitting notches in brim 710 so as to illuminate an area immediately in front of the wearer, at normal reading distances. If desired, the notches formed in brim 710 can be angled according to the arrangement described above with reference to FIG. 24.

The shell 700, as mentioned, is of a conventional design and preferably is formed of a rigid composite material. An inner band is provided and electrical conductors extending from lights 108 are carried in the band in the manner indicated above with reference to FIG. 12. Electrical conductors extend to the rear of the shell and are connected to a housing 105 fixed at the rear of the shell. Housing 105 provides a power source and switch providing interruptible energization of lights 108.

While there have been illustrated and described particular embodiments of the present invention, it will be appreciated that numerous changes and modifications will occur to those skilled in the art, and it is intended in the appended claims to cover all those changes and modifications that fall within the true sprit and scope of the present invention.

What is claimed is:

1. A lighted hat comprising:
   a rear head-fitting portion;
   a forward brim portion projecting forwardly of the head fitting portion with the rear head fitting and forward brim portions having a fore and aft extending centerline;
   a generally rigid and thin insert of the brim portion having upper and lower surfaces, and an outer edge including front and side portions thereof;
   fabric material tightly secured onto the upper and lower brim surfaces and around the brim outer edge to keep the thickness of the brim portion to a minimum;
   a pair of small, light emitting diodes that are laterally spaced from each other by a predetermined distance on either side of the centerline at or closely adjacent to the brim front edge portion positioned for directing cones of light forwardly therefrom so that there is an area immediately forwardly of the brim front edge that is unlighted between the cones of light from the pair of light emitting diodes; and
   a predetermined solid-state material of the light emitting diodes for providing high intensity light projecting forward from the brim portion with a minimum of power consumption.

2. The lighted hat of claim 1 wherein the rear head-fitting portion includes a power source attached thereto and layers of material, and
   electrical leads connected to the light emitting diodes that extend between the brim insert and the fabric material of the brim portion and between the material layers of the head fitting portion to the power source so that the leads are concealed from view for substantially the entire length thereof.

3. The lighted hat of claim 1 wherein the rear head-fitting portion comprises a crown portion of the hat having an adjustment strap at the rear thereof, and
   a power module mounted to the strap including an actuator switch for selectively powering the light emitting diodes on and off.

4. The lighted hat of claim 1 wherein the pair of light emitting diodes each include a lens portion, and
   compact light modules for the light emitting diodes each including a power source for the light emitting diode mounted therein, a user-operated on/off switch for selectively powering the diodes, and forward facing opening through which the lens portions of the diode projects adjacent the brim front edge portion for projecting light forwardly therefrom.

5. The lighted hat of claim 1 wherein the brim insert includes a pair of small, forwardly opening notches at the front edge portion thereof in which the pair of small, light emitting diodes are secured, and the fabric material includes a pair of cut-outs aligned with the brim insert notches so that the diodes can project therethrough.

6. The lighted hat of claim 5 wherein the head fitting portion includes an adjustment strap and a power source mounted to the adjustment strap.

7. The lighted hat of claim 1 including a power source and power supply medium for the light emitting diodes mounted to the head fitting and brim portions so as to avoid significant increase to the thickness of the brim portion.

8. The lighted hat of claim 7 wherein the head fitting portion includes an adjustment strap to which the power source is attached, the power supply medium includes electrical leads routed from the power source to the light emitting diodes between the fabric material and insert of the brim portion at the front edge thereof.

9. The light hat of claim 1 wherein the head fitting portion comprises a crown defining an interior space with the crown sized to fit snugly on a wearer's head received in the interior space, and a power source mounted to the crown external of the interior space thereof to keep the interior space free from obstruction for optimizing the fit and comfort of the crown when worn on a head.

10. The lighted hat of claim 1 including at least one thin photovoltaic cell for generating power for the light emitting diodes.

11. Headgear, comprising:

a crown for covering the wearers head, having opposed forward and rearward parts;

a brim forwardly extending from the forward part of the crown;

the brim having an outer edge, and opposed upper and lower surfaces separated by a thickness of the brim;

a lamp received in the brim at least partly disposed between the upper and the lower surfaces of the brim;

a housing attached to the rearward part of the crown;

an interruptible energy source disposed in the housing for energizing the lamp; and electrical conductors coupling the lamp to the interruptible energy source.

12. The headgear of claim 11 further comprising a second lamp laterally adjacent the said lamp and received in the brim so as to be at least partly disposed between the upper and the lower surfaces of the brim.

13. The headgear of claim 12 wherein the brim defines notches for receiving the lamps in close fitting relationship so as to orient the direction of light emanating from the lamps.

14. The headgear of claim 13 wherein the lamps comprise wherein the lights are high intensity light-emitting diodes of a predetermined material so that the predetermined lighted area is generated by a narrow light beam.

15. The headgear of claim 12 wherein the lamp emits predetermined lighted areas each having a conical shape with the conical areas intersecting at a predetermined distance within a predetermined distance range so that the overlapping lighted area increases in size with increasing distance from the wearer's face to minimize effects of light dissipation in the predetermined distance range.

16. The headgear of claim 14 wherein the interruptible energy source includes a power supply for energizing the lamps and a switch carried on the housing for selectively interrupting energization of the lamp.

17. The headgear of claim 16 wherein the power supply comprises at least one small disc-shaped battery power supply for the lamps to allow the housings to be compactly sized with each of the light-emitting diodes and the battery power supply therefor self-contained in respective ones of the housings.

18. The headgear of claim 11 wherein the crown is flexible.

19. The headgear of claim 11 wherein the crown is rigid.

20. Headgear, comprising:

a crown for covering the wearers head, having opposed forward and rearward parts;

a brim forwardly extending from the forward part of the crown;

the brim having an outer edge, and opposed upper and lower surfaces separated by a thickness of the brim;

a lamp received in the brim, at least partly disposed between the upper and the lower surfaces of the brim;

the lamp comprising a small solid-state light source of a predetermined material for generating a high intensity light beam therewith; and a module comprising a power source having a small, thin configuration for providing electrical power to the light source; a switch that selectively electrically connects the power source to the light source and includes an actuator portion for being shifted by a user to generate high intensity light from the lamp; and a housing having a predetermined compact configuration that contains the lamp and the power source, and has an opening through which the switch actuator portion extends.

21. The headgear of claim 20 wherein the housing includes a length of LEDs than approximately one and one-half inches, a width of LEDs than approximately one-inch, and a depth of LEDs than approximately one-half an inch.

22. The headgear of claim 21 wherein the power source comprises at least one small, thin disc-shaped battery having a predetermined small diameter and a predetermined thickness several times smaller than the diameter, and the housing predetermined compact configuration includes a maximum width slightly larger than the disc battery diameter, and ends of the housing spaced from each other along a lengthwise dimension of the housing with the housing configured along the lengthwise dimension to decrease in width from the housing maximum width toward both ends of the housing.

23. The headgear of claim 22 wherein the at least one disc-shaped battery comprises two identical disc-shaped batteries, and the housing predetermined compact configuration includes a depth slightly larger than twice the thickness of one of the batteries to allow two stacked batteries to be disposed in the housing.

24. The headgear of 23 wherein the predetermined small diameter of the battery is LEDs than approximately one-inch to allow the maximum width of the housing to be LEDs than approximately one-inch and the depth of the housing to be LEDs than approximately one-half an inch.

25. The headgear of claim 24 wherein the switch comprises a slide switch with the user pushing or pulling on the switch actuator portion for sliding thereof.

26. Headgear, comprising:

a crown for covering the wearers head, having opposed forward and rearward parts;

a brim forwardly extending from the forward part of the crown;

the brim having an outer edge, and opposed upper and lower surfaces separated by a thickness of the brim;

a compactly sized, self-contained lighting module comprising a small solid-state light source of a predetermined material for generating a high intensity light beam therewith; a power source having a small, thin configuration for providing electrical power to the light source, a switch that selectively electrically connects the power source to the light source and includes an actuator portion for being shifted by a user to generate the high intensity light from the light source, and a housing having a predetermined compact configuration that contains the light source and the power source, and has an opening through which the switch actuator portion extends.

27. The headgear of claim 26 wherein the predetermined compact configuration of the housing includes a length of LEDs than approximately one and one-half inches, a width of LEDs than approximately one-inch, and a depth of LEDs than approximately one-half an inch.

28. The headgear of claim 27 wherein the power source comprises at least one small, thin disc-shaped battery having a predetermined small diameter and a predetermined thickness several times smaller than the diameter, and the housing predetermined compact configuration includes a maximum width slightly larger than the disc battery diameter, and ends of the housing spaced from each other along a lengthwise dimension of the housing with the housing configured along the lengthwise dimension to decrease in width from the housing maximum width toward both ends of the housing.

29. The headgear of claim 28 wherein:

the at least one disc-shaped battery comprises two identical disc-shaped batteries, and the housing predetermined compact configuration includes a depth slightly larger than twice the thickness of one of the batteries to allow two stacked batteries to be disposed in the housing; and the predetermined small diameter of the battery is less than approximately one-inch to allow the maximum width of the housing to be less than approximately one-inch and the depth of the housing to be less than approximately one-half an inch.

30. The headgear of claim 26 wherein the switch comprises a slide switch with the user pushing or pulling on the switch actuator portion for sliding thereof.

31. The headgear of claim 26 wherein the crown is flexible.

32. The headgear of claim 26 wherein the crown is rigid.

* * * * *